United States Patent
Hong et al.

(10) Patent No.: US 7,567,493 B2
(45) Date of Patent: Jul. 28, 2009

(54) MULTILAYER RECORDING MEDIUM AND METHOD OF MANUFACTURING THE SAME

(75) Inventors: Tao Hong, Suwon-si (KR); Chong-sam Chung, Hwaseong-si (KR); Tae-kyung Kim, Seoul (KR); Woo-seok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 11/290,593

(22) Filed: Dec. 1, 2005

(65) Prior Publication Data

US 2006/0203680 A1    Sep. 14, 2006

(30) Foreign Application Priority Data

Mar. 10, 2005   (KR) .................. 10-2005-0020135

(51) Int. Cl.
  *G11B 7/20*   (2006.01)
  *G11B 7/26*   (2006.01)
(52) U.S. Cl. ........................................ 369/94; 369/283
(58) Field of Classification Search .............. 369/275.1, 369/275.2, 275.3, 275.4, 94, 286; 720/718
See application file for complete search history.

(56) References Cited

U.S. PATENT DOCUMENTS 5,373,499 A   12/1994   Imaino et al.

2004/0139459 A1 *   7/2004   Mishima et al. ............. 720/718

FOREIGN PATENT DOCUMENTS

EP   0 605 924 A2   7/1994
JP   2001-155380   6/2001

OTHER PUBLICATIONS

Search Report issued on Apr. 4, 2007 by the European Patent Office for European Patent Application No. 06110893.2.

* cited by examiner

*Primary Examiner*—Hoa T Nguyen
*Assistant Examiner*—Andrew J Sasinowski
(74) *Attorney, Agent, or Firm*—Stein McEwen, LLP

(57) ABSTRACT

A multilayer recording medium that prevents deterioration of a signal characteristic due to a mirror effect that may occur between recording layers and a method of manufacturing the same, the multilayer recording medium having at least two recording layers, wherein a thickness of at least one spacer layer between adjacent recording layers is different from a thickness of the other spacer layers such that a beam focusing on a recording layer is prevented from focusing on another recording layer corresponding to a mirror layer due to reflection. In the multilayer recording medium, a mirror effect is greatly reduced. In addition, the thickness of only a spacer layer exerting the most significant influence on the mirror effect is changed to prevent the deterioration of signal quality due to the mirror effect, and therefore, the structure of a multilayer recording medium is simplified.

24 Claims, 10 Drawing Sheets

MULTILAYER RECORDING MEDIUM AND METHOD OF MANUFACTURING THE SAME

CROSS-REFERENCE TO RELATED APPLICATION

This application claims the benefit of Korean Patent Application No. 2005-20135, filed on Mar. 10, 2005 in the Korean Intellectual Property Office, the disclosure of which is incorporated herein in its entirety by reference.

BACKGROUND OF THE INVENTION

1. Field of the Invention

An aspect of the present invention relates to a recording medium, and more particularly, to a multilayer recording medium that prevents deterioration of a signal characteristic due to a mirror effect that may occur between recording layers.

2. Description of the Related Art

To increase the storage capacity of a single-layer recording medium, many studies have been performed to develop recording media having a super-resolution near-field structure and multilayer recording media using a short wavelength of a laser beam and a high numerical aperture of an objective lens. As a result of the studies, a Blu-ray disc having a storage capacity of 25 GB per layer in a multi-layer structure has been developed using a blue-violet laser diode and a 0.85 numerical aperture (NA) objective lens. The Blu-ray disc can be used to record about 2 hours of high-definition television (HDTV) or about 13 hours of standard-definition TV.

Storage capacity can be increased using a multilayer recording medium since it is compatible with a single-layer optical disc and capable of being used in a conventional optical pickup. Examples of a multilayer recording medium include a dual-layer digital versatile disc read-only memory (DVD-ROM) disc, a ROM/RAM (rewritable) disc, a write-once (WO) disc, and a RAM/RAM disc. A multilayer recording medium has a capacity N times greater (N is the number of recording layers) than a single-layer recording medium.

In the structure of a multilayer recording medium, the thickness and reflectivity of a spacer layer are very important to the signal characteristics of the multilayer recording medium. The spacer layer should have a thickness of at least 10 μm to prevent crosstalk between recording layers. In addition, the reflectivity of each recording layer should be matched so that a signal detected by a photodetector has at least a predetermined intensity. Moreover, to compensate for spherical aberration, the total thickness of all layers in the multilayer recording medium should be within a compensation range of a compensation apparatus such as a beam expander.

FIG. 1 illustrates an example of a conventional multilayer recording medium having the structure of a quad-layer WO disc, in which a palladium (Pd) oxide layer doped with tellurium (TE), i.e., a Te—O—Pd layer is a layer that data is recorded onto and reproduced from. Referring to FIG. 1, the conventional multilayer recording medium includes a spacer layer having a thickness of 20 μm between adjacent recording layers to decrease the crosstalk therebetween. Spacer layers have the same thickness. In this structure, a mirror effect in which a beam reflected from one recording layer focuses on another recording layer occurs and results in a lot of crosstalk.

FIG. 2 illustrates a conventional multilayer recording medium having recording layers spaced apart a same distance. The mirror effect will be described in detail with reference to FIG. 2 below. Reference characters W1, W2, W3, and W4 denote distances between adjacent recording layers (i.e., thicknesses of respective spacer layers). The distances W1, W2, W3, and W4 are the same. It is assumed that a beam focuses on a recording layer 4 to reproduce data recorded on the recording layer 4. In this case, while the beam focuses at a point "a" on the recording layer 4, the beam reflected from a recording layer 3 focuses at a point "b" on a recording layer 2 and the beam reflected from the recording layer 2 focuses at a point "c" on a recording layer 0 because of the same distance between adjacent recording layers. As a result, due to signals at the points "b" and "c", a reproducing signal at the point "a" deteriorates, which is referred to as the mirror effect. As described above, the mirror effect occurs when a beam focuses on a first recording layer of a multilayer recording medium to reproduce data from the first recording layer and part of the beam is reflected and focused on a second layer, hereinafter referred to as a mirror layer. For example, in FIG. 2, the recording layer 2 and the recording layer 0 are mirror layers with respect to the recording layer 4.

Since signals are detected from other recording layers besides a target recording layer when reproducing information, the mirror effect deteriorates the quality of a signal and causes a lot of crosstalk. To solve this problem, Japanese Patent Publication No. 2001-155380 has proposed a multilayer recording medium having the structure illustrated in FIGS. 3A and 3B.

Referring to FIG. 3A, a distance between adjacent recording layers monotonously decreases in an advancing direction of an incident beam. Conversely, referring to FIG. 3B, a distance between adjacent recording layers monotonously increases in an advancing direction of an incident beam. In these structures, a beam focusing on one recording layer does not focus on another recording layer and thus the mirror effect is eliminated.

In this case, the mirror effect can be eliminated completely. But the conventional structure of a multilayer recording medium has some drawbacks. First, in these structures, compensation of spherical aberration is not considered. As described above, the total thickness of the multilayer recording medium should be less than a predetermined value. When the multilayer recording medium has a structure in which the thickness of a spacer layer monotonously increases in one direction, the total thickness of the multilayer recording medium may be out of a range for the compensation of spherical aberration. Second, manufacturing the conventional multilayer recording medium with spacer layers having different thicknesses is complicated and costly. Moreover, it is not easy to calculate the reflectivity of each layer in this structure.

SUMMARY OF THE INVENTION

According to an aspect of the present invention, there is provided a multilayer recording medium having a thickness and reflectivity to prevent a mirror effect and a method of manufacturing the same.

According to another aspect of the present invention, there is provided a multilayer recording medium and method of manufacturing the same, by which a mirror effect is prevented efficiently in terms of manufacturing feasibility and cost without major changes to an existing multilayer structure.

According to an aspect of the present invention, there is provided a multilayer recording medium having at least two recording layers, wherein a thickness of at least one spacer layer between adjacent recording layers is different from a thickness of the other spacer layers such that a beam focusing on a recording layer is prevented from focusing on another recording layer corresponding to a mirror layer due to reflection.

According to another aspect of the present invention, when the different thickness of the at least one spacer layer is D and the thickness of the other spacer layers is $D_0$, a difference between D and $D_0$ may satisfy $|D-D_0| \geq 2\delta + 0.1 D_0$, where $\delta$ is thickness error tolerance that may occur in a spacer layer during manufacturing.

According to an aspect of the present invention, when a thickness of a spacer layer between a recording layer "i" and a recording layer "i−1" is $D_i$, the thickness $D_i$ may satisfy $$\sum_{i=K+1}^{L} D_i \neq \sum_{j=L+1}^{Q} D_j,$$

where N is the number of all recording layers included in the multilayer recording medium, K=0, 1, 2, ..., N−3 is a serial number of each recording layer, L=K+1, K+2, ..., N−2 is a serial number of a recording layer that is located above the recording layer K and from which an incident beam is reflected, and Q=L+1, L+2, ..., N−1 is a serial number of a recording layer located above the recording layer L from which the incident beam is reflected.

According to an aspect of the present invention, the spacer layer having the different thickness may be a spacer layer that is second farthest from an incident beam.

According to an aspect of the present invention, the spacer layer having the different thickness may be a spacer layer that exerts at least a predetermined degree of influence on a mirror effect.

According to an aspect of the present invention, the influence on the mirror effect may be determined using a ratio $\alpha_{KM}$ of intensity of a beam reflected from the mirror layer to intensity of a beam reflected from the recording layer on which the beam focuses and expressed by $$\alpha_{KM} = \frac{R_M}{R_K} \prod_{i=K+1}^{M-1} \frac{R_i^2}{T_i^2},$$

where K is a serial number of the recording layer on which the beam focuses, M is a serial number of the mirror layer, $R_i$ is reflectivity of a recording layer "i", and $T_i$ is transmissivity of the recording layer "i".

According to an aspect of the present invention, when the ratio $\alpha_{KM}$ is less than a predetermined value, the reflectivity of the recording layer may be set to a maximum value. When the ratio $\alpha_{KM}$ is greater than a predetermined value, the reflectivity of the recording layer may be set to a value that produces a minimum jitter value. The predetermined value may be 0.02.

According to an aspect of the present invention, when the number of all recording layers included in the multilayer recording medium is N, a mean reflectivity of each recording layer is $R_v$, and a serial number of each recording layer is K, a reflectivity $R_K$ of each recording layer K may satisfy $$R_K = \frac{R_v}{\prod_{i=K+1}^{N-1} T_i^2}, \quad R_{N-1} = R_v.$$

According to an aspect of the present invention, the recording layer may have a maximum mean reflectivity Rv max satisfying $$R_{v\,max} = \prod_{i=1}^{N-1} (1 - R_i)^2,$$

where N is the number of recording layers included in the multilayer recording medium, and Ri is the reflectivity of each recording layer and is expressed by $$R_i = \frac{R_{N-1}}{\prod_{j=i+1}^{N-1} (1 - R_j)^2}.$$

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

Figure 1:
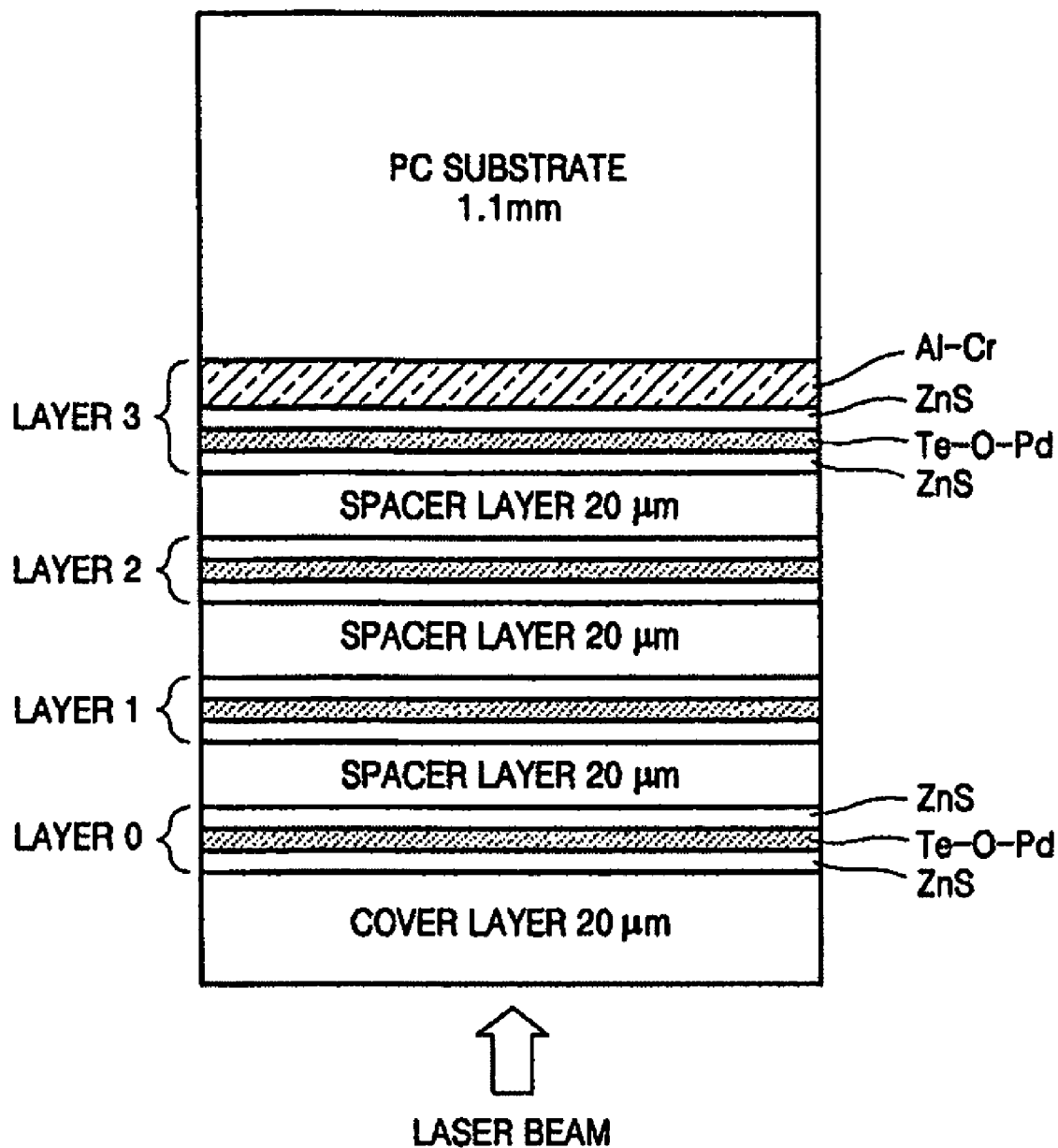
FIG. 1 illustrates an example of a conventional multilayer recording medium.
Figure 2:
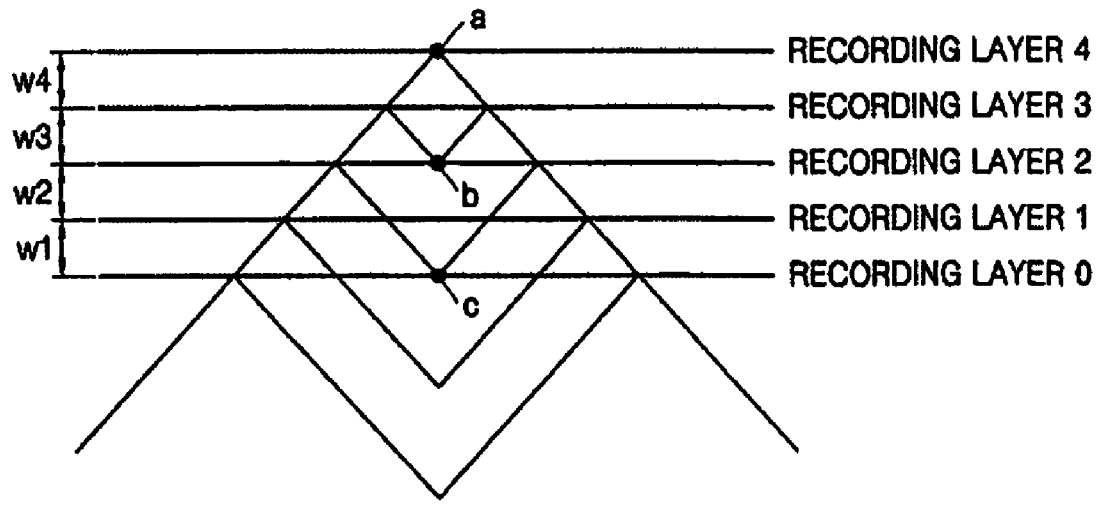
FIG. 2 is a schematic diagram of the conventional multilayer recording medium with recording layers spaced the same distance apart.
Figure 3A:
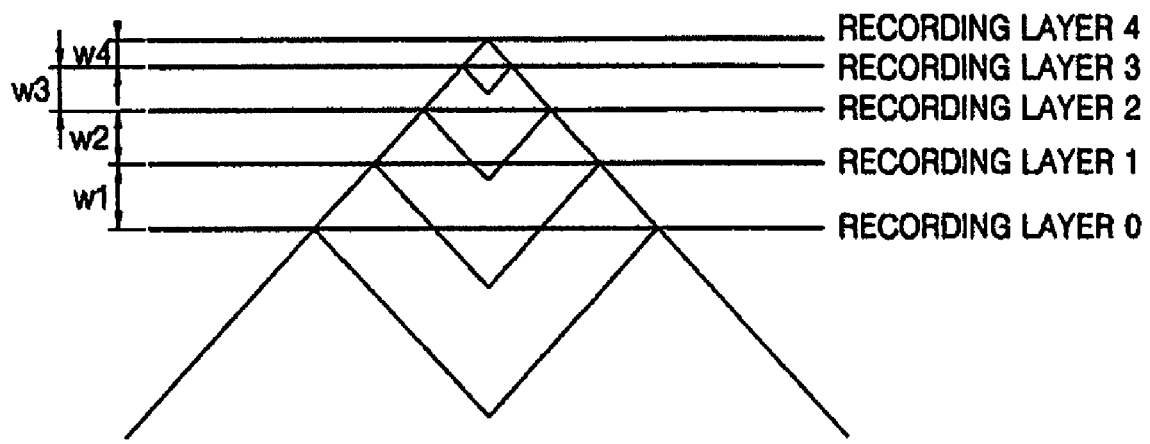
FIGS. 3A and 3B are schematic diagrams illustrating the conventional structures of a multilayer recording medium for reducing a mirror effect.
Figure 3B:
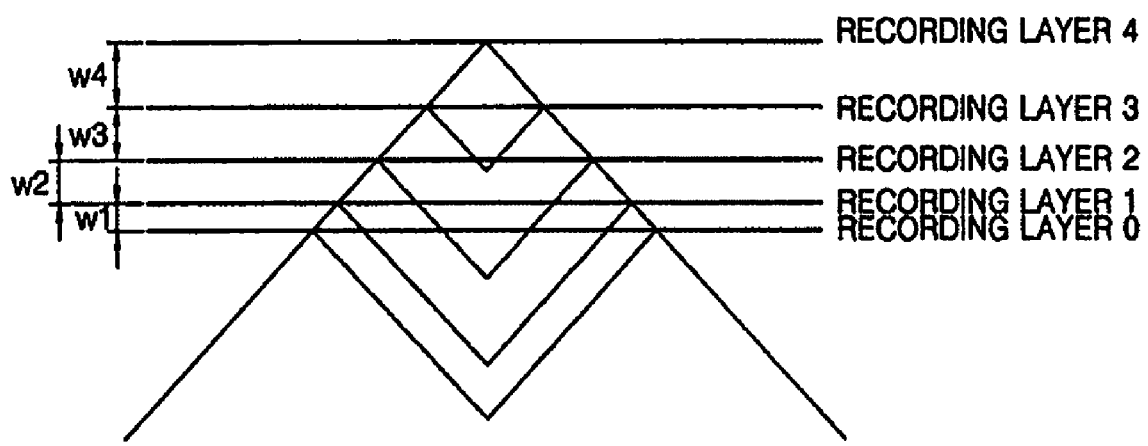

Reference will now be made in detail to the present embodiments of the present invention, examples of which are illustrated in the accompanying drawings, wherein like reference numerals refer to the like elements throughout. The embodiments are described below in order to explain the present invention by referring to the figures.

When manufacturing recording media having multiple recording layers, the following should be considered.

First of all, crosstalk between recording layers should be reduced. Generally, when a distance between adjacent recording layers is at least 10 µm, the deterioration of signal characteristics due to crosstalk therebetween can be prevented. Accordingly, it is assumed that a minimum distance between adjacent recording layers is at least 10 µm in a recording medium according to embodiments of the present invention. In addition, the total thickness of a multilayer recording medium should be within a predetermined range taking account of spherical aberration. Moreover, to eliminate a mirror effect, a distance between adjacent recording layers needs to be adjusted appropriately. Meanwhile, signal characteristics may be deteriorated due to a slight difference in the distance between adjacent recording layers. Besides, the multilayer recording medium needs to have a simple structure taking account of manufacturing feasibility and costs.

Accordingly, in an embodiment of the present invention, a distance between adjacent recording layers and reflectivity are determined to prevent a mirror effect in a recording medium having multiple recording layers.

Meanwhile, a spacer layer between adjacent recording layers in a multilayer recording medium according to embodiments of the present invention may be designed using various structures. For example, the spacer layer may be implemented as a dielectric layer or a recording auxiliary layer. The present invention does not concentrate on the structure of the spacer layer but concentrates on setting the distance between adjacent recording layers, i.e., the thickness of the spacer layer and reflectivity to prevent a mirror effect. The spirit of the present invention can be applied to the diverse structures of a multilayer recording medium.

Before setting forth a multilayer recording medium according to embodiments of the present invention, the mirror effect and signal characteristics of each recording layer in a recording medium having a multilayer structure will be described first.

Figure 4:
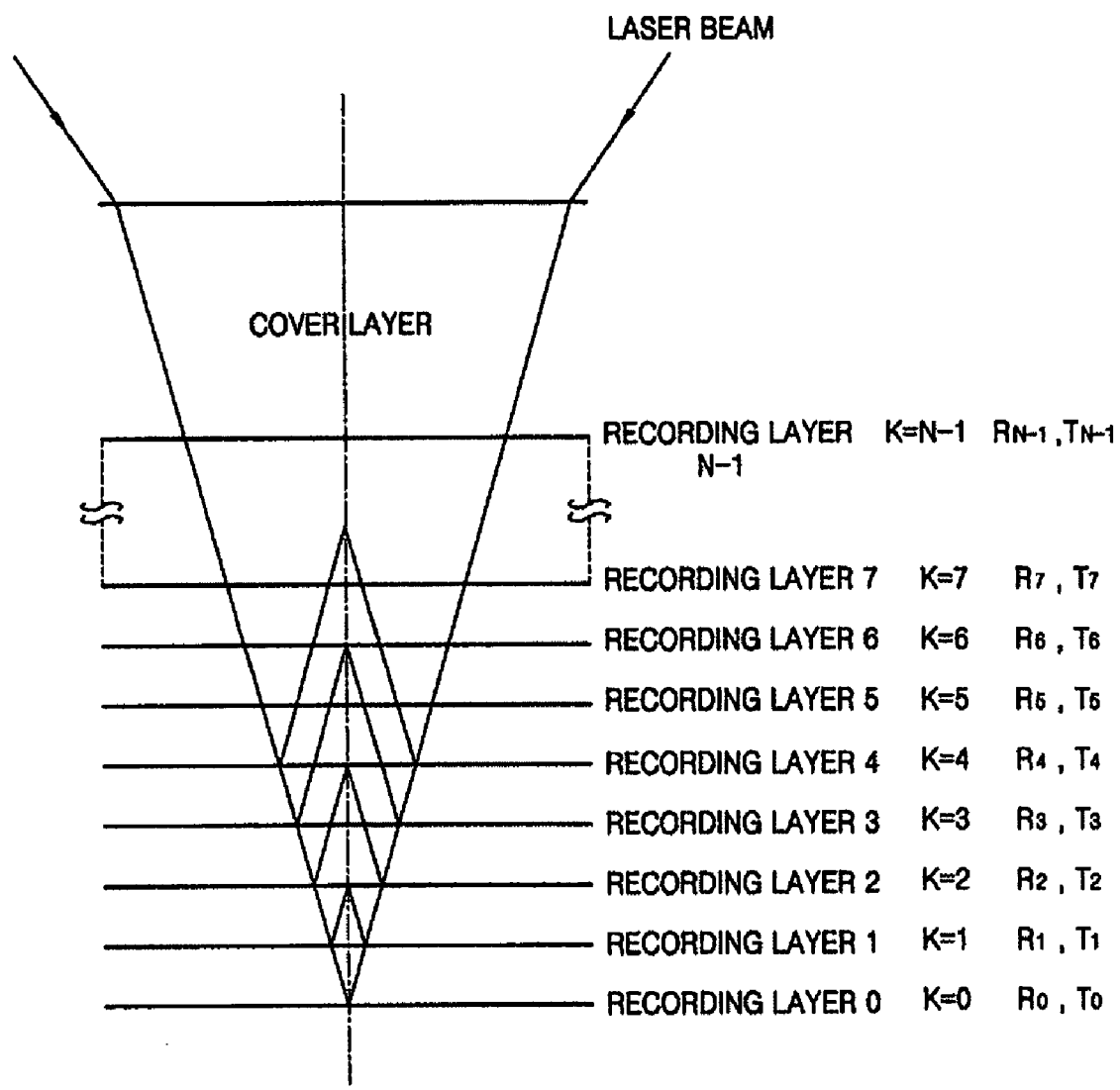
FIG. 4 is a schematic diagram of a general multilayer recording medium according to an embodiment of the present invention.

FIG. 4 is a schematic diagram of a general multilayer recording medium, according to an embodiment of the present invention. It is assumed that the multilayer recording medium has N recording layers. Various types of layers such as a dielectric layer and an auxiliary layer for recording/reproducing may be disposed among the N recording layers according to a recording/reproducing method of the multilayer recording medium. The definitions of terms used in this specification will be described below.

A spacer layer is a layer between adjacent recording layers. As described above, an embodiment of the present invention is characterized by appropriately setting the thickness of the spacer layer, i.e., the distance between adjacent recording layers to eliminate the mirror effect.

In addition, integers 0 through N−1 are sequentially allocated to recording layers starting from a recording layer distal from an incident laser beam radiated for recording/reproducing information on/from a recording medium. Accordingly, a recording layer 0 is defined as the distal recording layer and a recording layer N−1 is defined as the proximal recording layer. In addition, $R_i$ and $T_i$ are respectively defined as the reflectivity and the transmissivity of a recording layer "i" and $D_i$ is defined as the thickness of a spacer layer, i.e., the distance between the recording layer "i" and a recording layer i−1.

The mirror effect occurs when a layer on which data to be reproduced (hereinafter, referred to as a "reproducing layer"), and a mirror layer are symmetrical to another layer. In other words, when the beam incident on the reproducing layer is reflected from another recording layer and the reflected beam focuses on the mirror layer, crosstalk occurs.

Figure 5:
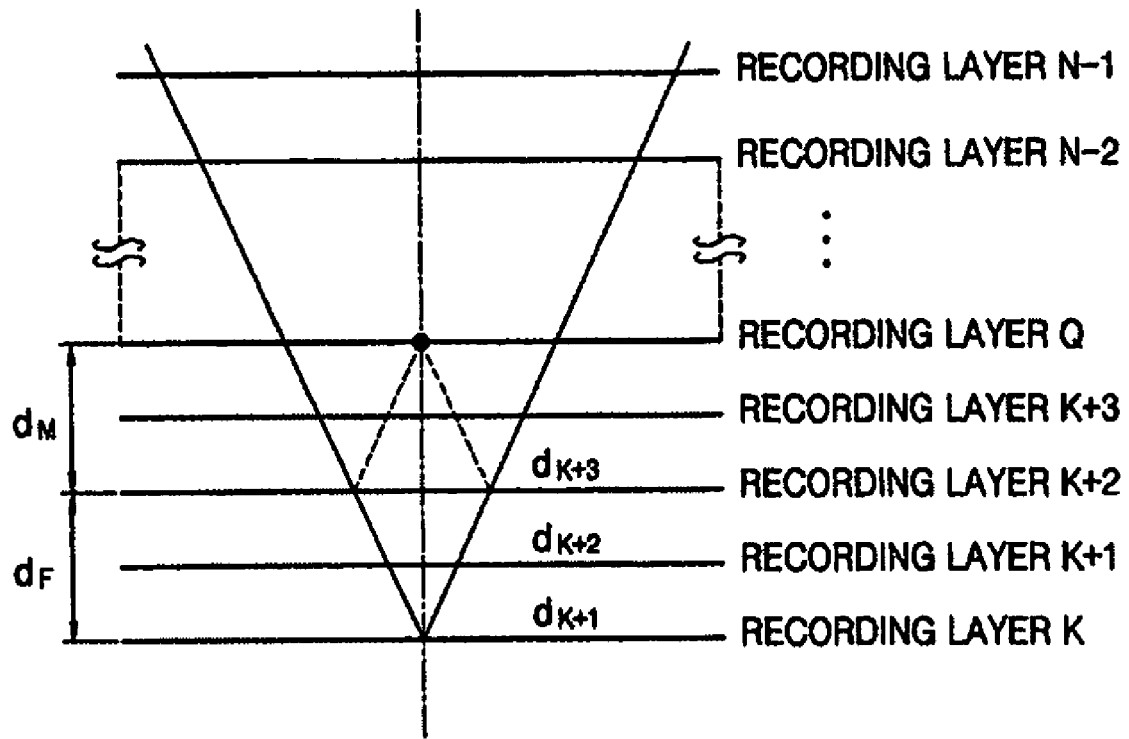
FIG. 5 is a diagram for explaining conditions for preventing the mirror effect in a multilayer recording medium, according to an embodiment of the present invention.

FIG. 5 is a diagram for explaining conditions for preventing the mirror effect in a multilayer recording medium, according to an embodiment of the present invention. Referring to FIG. 5, when data is reproduced from a recording layer K, the distance between adjacent recording layers must satisfy the condition defined by Equation 1 to prevent the mirror effect:

$$\sum_{i=K+1}^{L} D_i \neq \sum_{j=L+1}^{Q} D_j \qquad (1)$$

where K=0, 1, 2, ..., N−3 is a serial number of each recording layer. When K=N−2 or N−1, that is, with respect to two uppermost recording layers, the mirror effect does not occur. Therefore, N−2 and N−1 are excluded from the values of K. In addition, L is a serial number of a recording layer, which is located above the recording layer K and from which an incident beam is reflected (L=K+1, K+2, ..., N−2), and Q is a recording layer located above the recording layer L from which the incident beam is reflected (Q=L+1, L+2, ..., N−1).

For example, to prevent the mirror effect caused by a beam reflected from a recording layer K+2, i.e., L=K+2, the sum of thicknesses of spacer layers between the recording layer K and the recording layer K+2, i.e., $d_F = d_{K+1} + d_{K+2}$, must be different from the sum $d_M$ of thicknesses of spacer layers between the recording layer K+2 and the arbitrary recording layer Q. In other words, Equation 1 means that when data is reproduced from the recording layer K, on the basis of a recording layer from which the incident beam is reflected among recording layers located above the recording layer K (hereafter, referred to as a "reflecting layer"), the sum of thicknesses of spacer layers between the recording layer K and the reflecting layer (i.e., the left side of Equation 1) must be different from the sum of thicknesses of spacer layers between the reflecting layer and the arbitrary recording layer Q (i.e., the right side of Equation 1).

Meanwhile, the intensity of a beam reflected from a mirror layer is different from the intensity of a beam reflected from a reproducing layer on which the beam focuses to reproduce data. When a ratio of the intensity of a beam reflected from the mirror layer to the intensity of a beam reflected from the reproducing layer is represented by $\alpha_{KM}$, the ratio $\alpha_{KM}$ shows qualitatively how much crosstalk results from the mirror effect. The ratio $\alpha_{KM}$ of the intensity of a reflected beam from a recording layer M corresponding to the mirror layer to the intensity of a reflected beam from the recording layer K corresponding to the reproducing layer can be expressed by Equation 2:

$$\alpha_{KM} = \frac{R_M}{R_K} \prod_{i=K+1}^{M-1} \frac{R_i^2}{T_i^2}, \tag{2}$$

where K denotes the reproducing layer on which an incident beam really focuses (K=0, 1, ..., N−3) and M is a serial number denoting the mirror layer.

Figure 6:
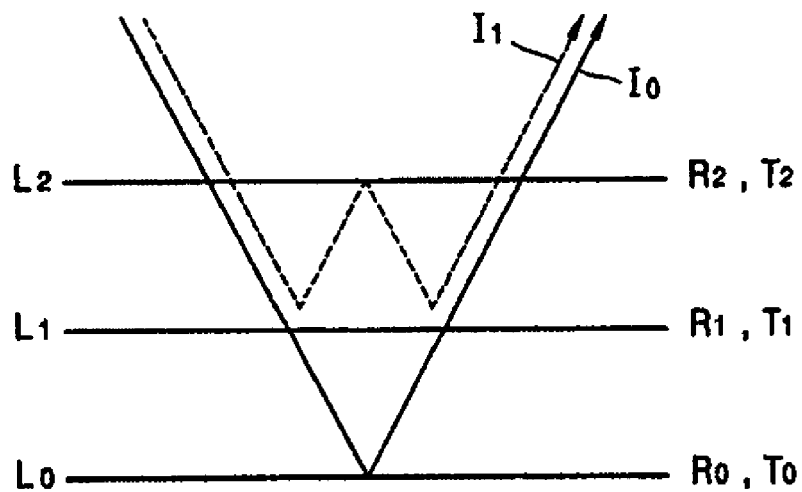
FIG. 6 is a diagram for explaining a procedure for calculating an intensity ratio of a beam reflected from a mirror layer to a beam reflected from a reproducing layer in a multilayer recording medium, according to an embodiment of the present invention.

Equation 2 can be obtained through the following procedure. FIG. 6 is a diagram for explaining the procedure for calculating the intensity ratio $\alpha_{KM}$ of a reflected beam from the mirror layer M to a reflected beam from the reproducing layer K in a multilayer recording medium, according to an embodiment of the present invention.

When the multilayer recording medium has three recording layers, a procedure for obtaining the intensity ratio of a beam $I_1$ reflected from the mirror layer (i.e., a recording layer $L_2$) to a beam $I_0$ reflected from the reproducing layer (i.e., a recording layer $L_0$) will be described with reference to FIG. 6.

When the intensity of an incident beam is represented with "I", the intensity of the beam $I_0$ which focuses on the recording layer $L_0$ from which data is to be reproduced is calculated as $I \times T_1 \times R_0 \times T_1$. In addition, the intensity of the beam $I_1$ due to the mirror effect, which is reflected from the recording layer $L_2$ corresponding to a first mirror layer of the recording layer $L_0$ and from a recording layer $L_1$ and then output, is calculated as $I \times R_1 \times R_2 \times R_1$. Accordingly, the intensity ratio $(I_1/I_0)$ between the beam reflected from the mirror layer $L_2$ and the beam reflected from the reproducing layer $L_0$ is calculated as $$\frac{R_2}{R_0} \times \frac{R_1^2}{T_1^2}.$$

As described above, the intensity ratio between the beam reflected from the mirror layer M and the beam reflected from the reproducing layer K may be expressed using the reflectivity and the transmissivity of the two layers. Accordingly, Equation 2 can be inferred.

Figure 7:
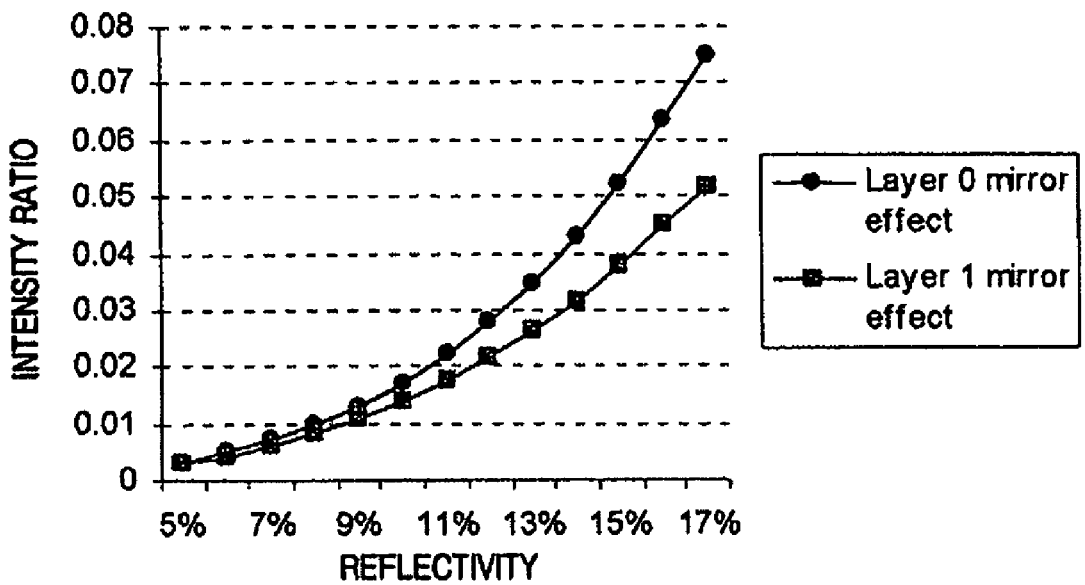
FIG. 7 is a graph of reflectivity versus the intensity ratio according to the mirror effect in a multilayer recording medium having four recording layers (hereinafter, referred to as a quad-layer recording medium), according to an embodiment of the present invention.

FIG. 7 is a graph of reflectivity versus the intensity ratio according to the mirror effect in a quad-layer recording medium, according to an embodiment of the present invention. Referring to FIG. 7, the intensity ratio with respect to each mirror layer increases with the increase of the reflectivity of the quad-layer recording medium. In particular, the recording layer 0 distal from an incident beam has a greater mirror effect than the recording layer 1. Accordingly, decreasing the reflectivity of each recording layer is a feasible way to decrease the deterioration of signal characteristics, i.e., the mirror effect due to the crosstalk between adjacent recording layers. However, decreasing the reflectivity has a drawback in that it causes the carrier to noise ratio (CNR) of a reproducing signal to decrease.

Meanwhile, in the quad-layer recording medium illustrated in FIG. 7, only the recording layers 0 and 1 positioned at the bottom have mirror layers, respectively. Other recording layers 2 and 3 are not influenced by the mirror effect during reproducing and thus are not illustrated in the graph of FIG. 7.

Figure 8:
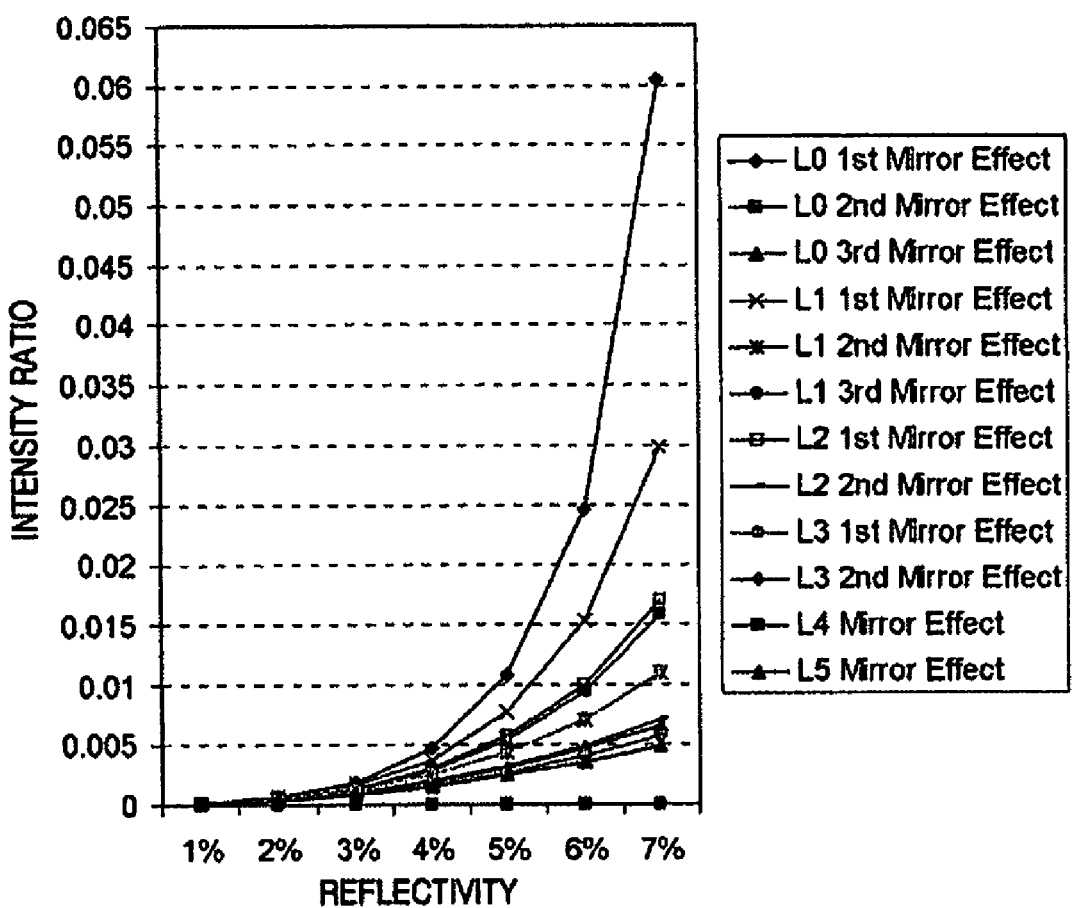
FIG. 8 is a graph of reflectivity versus the intensity ratio according to the mirror effect in a multilayer recording medium having eight recording layers (hereinafter, referred to as an octa-layer recording medium), according to an embodiment of the present invention.
Figure 9:
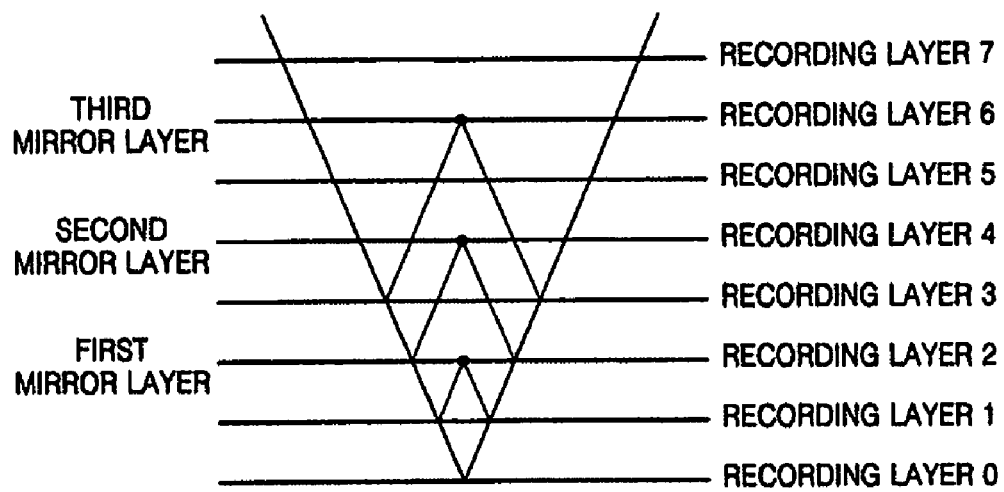
FIG. 9 is a diagram for explaining a plurality of mirror layers present in the octa-layer recording medium, according to an embodiment of the present invention.

FIG. 8 is a graph of reflectivity versus the intensity ratio according to the mirror effect in an octa-layer recording medium, according to an embodiment of the present invention. In the octa-layer recording medium, only 6 recording layers from the bottom have mirror layers. Each of recording layers 0 and 1 at the bottom has three mirror layers. Each of recording layers 2 and 3 has two mirror layers. Each of recording layers 4 and 5 has one mirror layer. Referring to FIG. 9, which is a diagram for explaining a plurality of mirror layers present in the octa-layer recording medium, when a beam focuses on the recording layer 0 to reproduce data recorded on the recording layer 0, reflected beams may focus on the recording layers 2, 4 and 6, respectively. Accordingly, the recording layer 0 has three mirror layers, i.e., the recording layers 2, 4, and 6. In other words, mirror effects caused by the three mirror layers occur when data is recorded on the recording layer 0. Here, with respect to a recording layer having a plurality of mirror layers, the mirror layers are defined as follows. A mirror layer nearest to the recording layer is referred to as a first mirror layer and a second nearest mirror layer is referred to as a second mirror layer. Referring back to FIG. 8, the intensity ratio with respect to each mirror layer increases with the increase of the reflectivity of the octa-layer recording medium.

In addition, since the intensity ratios are very different among the mirror layers, it can be inferred that the influence of each mirror layer on the entire mirror effect is very different. In this case, it is efficient to eliminate only the influence of a mirror layer that causes at least a predetermined magnitude of the mirror effect without eliminating the influence of all mirror layers. It will be inefficient to eliminate the influence of all mirror layers even when the influence of some mirror layers is ignorable. For example, referring to FIG. 8, the entire mirror effect can be remarkably decreased by eliminating the largest mirror effect which is caused by a first mirror layer of the recording layer 0 or by a first mirror layer of the recording layer 1.

Figure 10A:
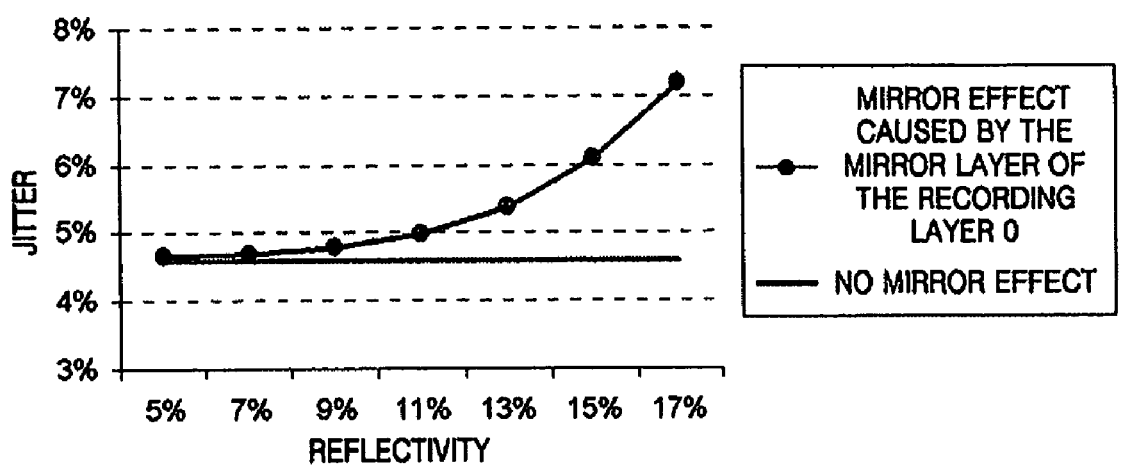
FIGS. 10A and 10B are graphs illustrating relationships between reflectivity and mirror effects caused by mirror layers of recording layers 0 and 1, respectively, in the quad-layer recording medium, according to an embodiment of the present invention.
Figure 10B:
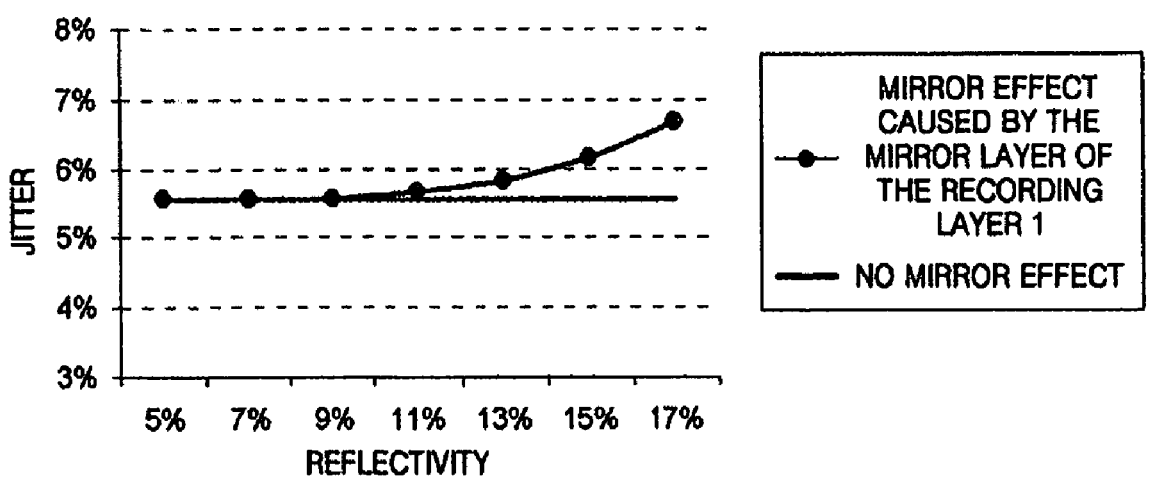

FIGS. 10A and 10B are graphs illustrating relationships between reflectivity and mirror effects caused by mirror layers of recording layers 0 and 1, respectively, in the quad-layer recording medium, according to an embodiment of the present invention. The Y-axis in the graphs indicates a jitter value, which increases with the increase of a mirror effect and thus indicates the influence of the mirror effect.

Referring to FIGS. 10A and 10B, the mirror effect caused by the mirror layer of the recording layer 0 and the mirror effect caused by the mirror layer of the recording layer 1 increase with the increase of the reflectivity. However, the mirror effect caused by the mirror layer of the recording layer 1 is not as large as the mirror effect caused by the mirror layer of the recording layer 0.

Figure 11A:
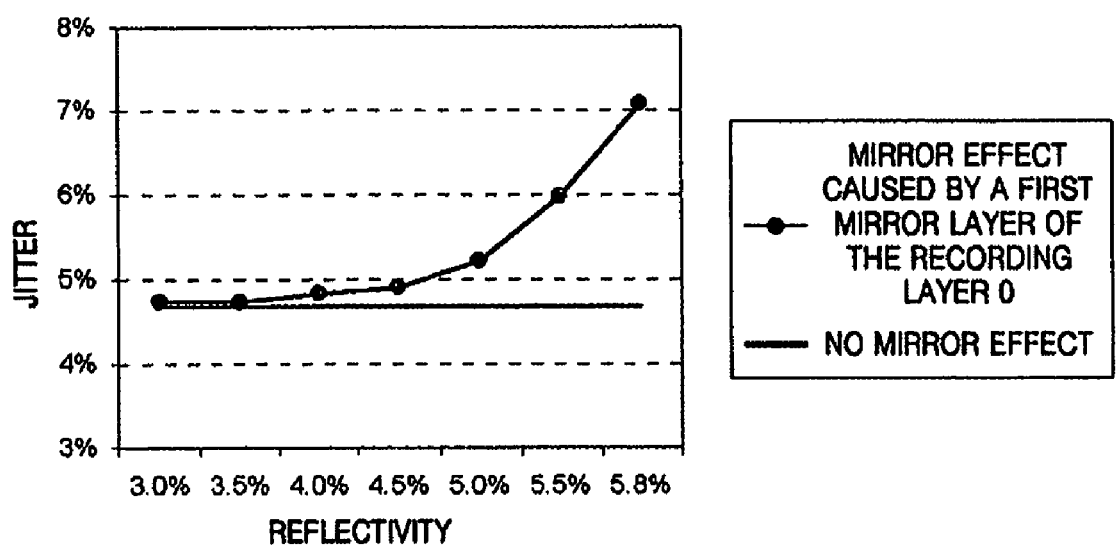
FIGS. 11A through 11C are graphs illustrating relationships between reflectivity and mirror effects caused by mirror layers of recording layers 0 and 1 in the octa-layer recording medium, according to an embodiment of the present invention.
Figure 11B:
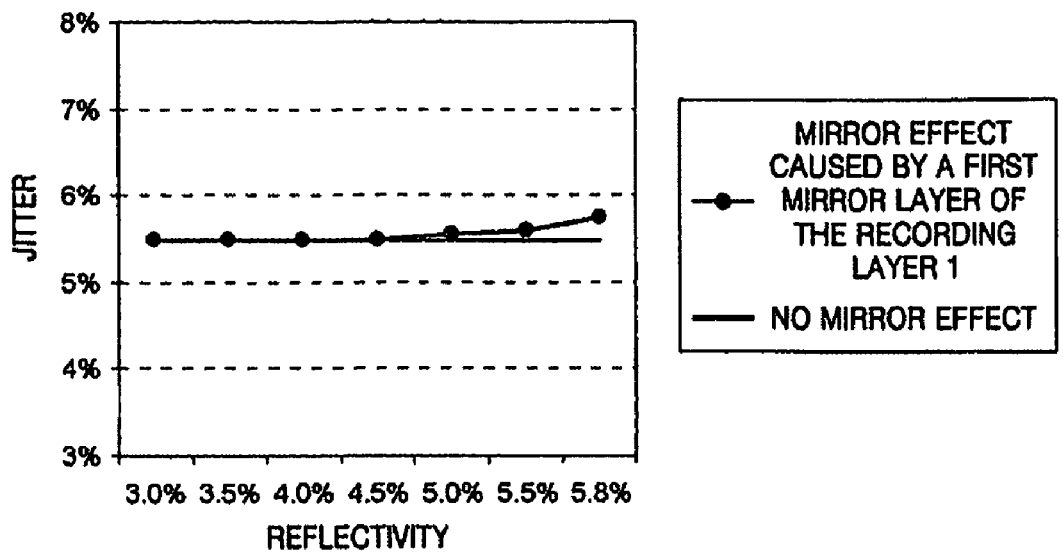
Figure 11C:
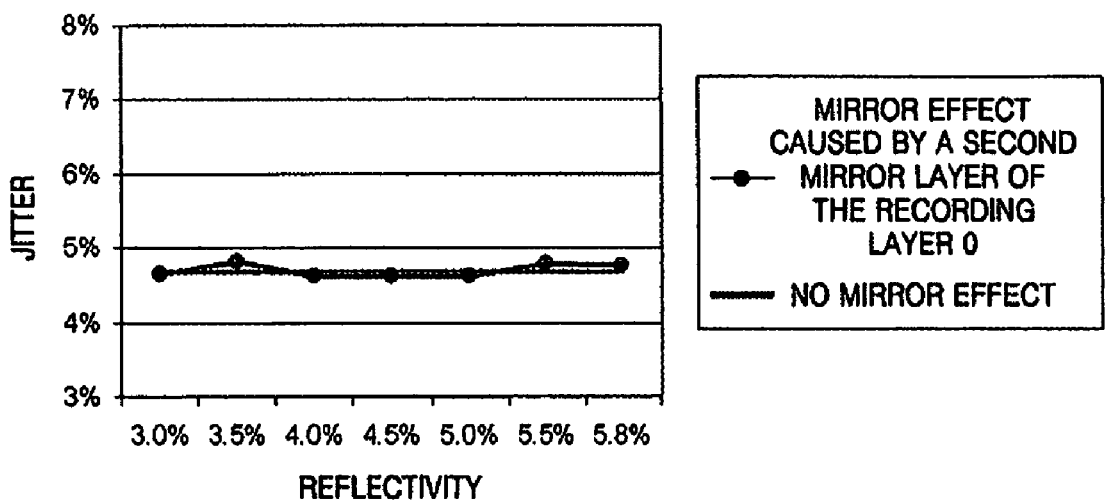

FIGS. 11A through 11C are graphs illustrating relationships between reflectivity and mirror effects caused by mirror layers of recording layers 0 and 1 in the octa-layer recording medium, according to an embodiment of the present invention. In detail, FIG. 11A is a graph illustrating the relationship between the reflectivity and a mirror effect caused by a first mirror layer of the recording layer 0. FIG. 11B is a graph illustrating the relationship between the reflectivity and a mirror effect caused by a first mirror layer of the recording layer 1. FIG. 11C is a graph illustrating the relationship between the reflectivity and a mirror effect caused by a second mirror layer of the recording layer 0.

Referring to FIGS. 11A through 11C, although several mirror layers exist with respect to each recording layer in the octa-layer recording medium, only some mirror layers from the plurality of mirror layers greatly influence the entire mirror effect. In other words, the mirror effect caused by the first mirror layer of the recording layer 0 rapidly increases with the increase of the reflectivity as illustrated in FIG. 11A, but the mirror effect caused by the first mirror layer of the recording layer 1 (illustrated in FIG. 11B) and the mirror effect caused by the second mirror layer, which is farther away than the first mirror layer, of the recording layer 0 (illustrated in FIG. 11C) are small compared to that illustrated in FIG. 11A. In other words, among a plurality of mirror layers of the recording layers in a multilayer recording medium, the influence of mirror layers other than some mirror layers causing a great mirror effect is so small as to be ignorable. For example, the second mirror layer of the recording layer 0 has a very small intensity ratio of about 0.01. Accordingly, an embodiment of the present invention concentrates on eliminating a mirror effect caused by a mirror layer exerting great influence on the entire mirror effect based on the above-described fact and provides a multilayer recording medium having a simple structure. Here, it is preferable to eliminate a mirror effect caused by a mirror layer having an intensity ratio of greater than 0.02.

Meanwhile, when a beam is incident onto a multilayer recording medium from above, the reflectivity of a recording layer positioned at a lower portion should be greater than that of a recording layer positioned at an upper portion. This is because a beam has a longer traveling path to the lower recording layer than to the upper recording layer and consequently light loss that may occur during the beam journey needs to be compensated for to accomplish uniform signal characteristics in an optical pickup or the like. Accordingly, a recording layer at the bottom of the multilayer recording medium has the most reflectivity. Since the reflectivity is proportional to the mirror effect, the mirror effect caused by the recording layer at the bottom exerts the most significant influence on the signal characteristics.

Briefly, signal characteristics can be improved by eliminating the mirror effect caused by a first mirror layer of the recording layer at the bottom of a multilayer recording medium.

Meanwhile, in a multilayer recording medium, a beam focusing on each recording layer should have the same mean reflectivity of $R_v$. In other words, a beam detected by an optical pickup after focusing on each recording layer is required to have the same intensity in order to obtain uniform signal characteristics with respect to all recording layers. A reflectivity $R_K$ of a recording layer K can be calculated using Equation 3:

$$R_K = \frac{R_v}{\prod_{i=K+1}^{N-1} T_i^2}. \tag{3}$$

Here, a reflectivity $R_{N-1}$ of a recording layer N−1 positioned at the top of the multilayer recording medium is equal to $R_v$.

Table 1 shows the reflectivity R and the transmissivity T of each recording layer, which are calculated when no light loss occurs in a quad-layer recording medium.

TABLE 1

|     | layer 3 | layer 2 | layer 1 | layer 0 |
| --- | --- | --- | --- | --- |
| R | 5.00% | 5.25% | 6.17% | 7.01% |
| T | 95.00% | 94.75% | 93.83% | 92.99% |
| R | 10.00% | 10.99% | 15.58% | 21.87% |
| T | 90.00% | 89.01% | 84.42% | 78.13% |
| R | 15.00% | 17.22% | 30.30% | 62.37% |
| T | 85.00% | 82.78% | 69.70% | 37.63% |
| MAX |  |  |  |  |
| R | 16.90% | 19.71% | 37.96% | 98.64% |
| T | 83.10% | 80.29% | 62.04% | 1.36% |

Referring to Table 1, the reflectivity R and the transmissivity T of each recording layer are calculated when a mean reflectivity is set to 5, 10, and 15%. A maximum mean reflectivity is 16.90%. If light loss occurs in the quad-layer recording medium, the maximum mean reflectivity will decrease.

Table 2 shows the reflectivity R and the transmissivity T of each recording layer, which are calculated when no light loss occurs in an octa-layer recording medium.

TABLE 2

|     | layer 7 | layer 6 | layer 5 | layer 4 | layer 3 | layer 2 | layer 1 | layer 0 |
| --- | --- | --- | --- | --- | --- | --- | --- | --- |
| R | 3.00% | 3.09% | 3.40% | 3.64% | 3.92% | 4.24% | 4.63% | 5.24% |
| T | 97.00% | 96.91% | 96.60% | 96.36% | 96.08% | 95.76% | 95.37% | 94.76% |
| R | 4.00% | 4.16% | 4.73% | 5.21% | 5.79% | 6.53% | 7.47% | 9.07% |
| T | 96.00% | 95.84% | 95.27% | 94.79% | 94.21% | 93.47% | 92.53% | 90.93% |
| R | 5.00% | 5.25% | 6.17% | 7.01% | 8.11% | 9.60% | 11.75% | 15.83% |
| T | 95.00% | 94.75% | 93.83% | 92.99% | 91.89% | 90.40% | 88.25% | 84.17% |
| R | 6.00% | 6.36% | 7.74% | 9.10% | 11.01% | 13.90% | 18.76% | 30.12% |
| T | 94.00% | 93.64% | 92.26% | 90.90% | 88.99% | 86.10% | 81.24% | 69.88% |
| MAX |  |  |  |  |  |  |  |  |
| R | 7.20% | 7.72% | 9.82% | 12.07% | 15.61% | 21.92% | 35.97% | 94.02% |
| T | 92.80% | 92.28% | 90.18% | 87.93% | 84.39% | 78.08% | 64.03% | 5.98% |

Referring to Table 2, the reflectivity R and the transmissivity T of each recording layer are calculated when a mean reflectivity is set to 3, 4, 5, and 6%. A maximum mean reflectivity is 7.20% in the octa-layer recording medium when no light loss occurs. If light loss occurs in the octa-layer recording medium, the maximum mean reflectivity will decrease.

As described above, the mirror effect can be decreased by decreasing the reflectivity in a multilayer recording medium.

However, the decrease of the reflectivity causes the CNR of a reproducing signal to decrease due to noise, thereby deteriorating the characteristics of the reproducing signal. A jitter characteristic can be improved to a certain extent by increasing the reflectivity when noise exists, but the increase of the reflectivity is limited in improving the jitter characteristic since it causes an increased in the mirror effect. Accordingly, the reflectivity is selected from an optimal range giving a relatively small jitter value, taking account of noise and the mirror effect.

Figure 12:
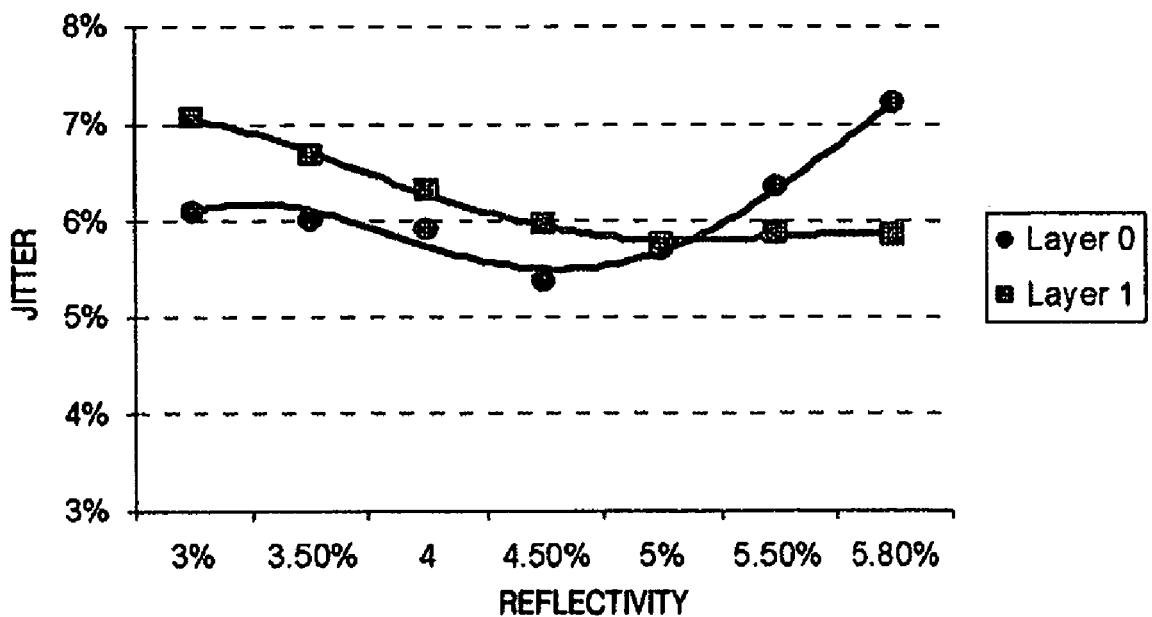
FIG. 12 is a graph of reflectivity versus jitter of a reproducing signal when noise and a mirror effect exist in a multilayer recording medium, according to an embodiment of the present invention.

FIG. 12 is a graph of reflectivity versus the jitter of a reproducing signal when noise and a mirror effect exist in a multilayer recording medium, according to an embodiment of the present invention. Referring to FIG. 12, when the reflectivity of a recording layer 0 producing the largest mirror effect is 4.50%, the smallest jitter value is obtained. Accordingly, the reflectivity of the lowest recording layer 0 is selected from a range of 4.3 to 4.7% in which the jitter value is less than about 6%. Then, the reflectivity of other recording layers can be calculated using Equation 3.

As described above, a mirror effect can be eliminated by setting the distance between adjacent recording layers, i.e., the thickness of each spacer layer to satisfy the condition defined by Equation 1 to prevent a mirror effect in a multilayer recording medium. However, setting the thickness of each spacer layer as described above may cause manufacturing to be difficult and manufacturing costs to increase. Since only some of a plurality of mirror layers have a significant influence on an entire mirror effect, only a mirror effect of a mirror layer exerting a most significant influence on the entire mirror effect is eliminated to facilitate manufacturing and obtain satisfactory characteristics of a reproducing signal.

Figure 13:
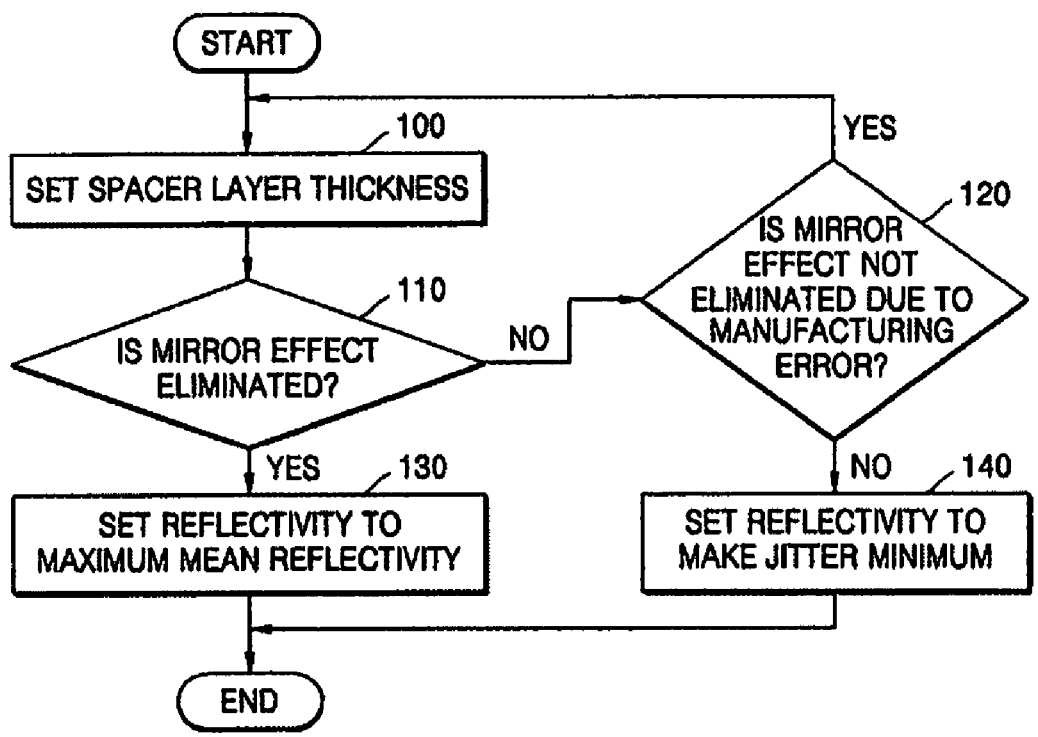
FIG. 13 is a flowchart of a method of manufacturing a multilayer recording medium, according to an embodiment of the present invention.

FIG. 13 is a flowchart of a method of manufacturing a multilayer recording medium, according to an embodiment of the present invention. In the method, when a mirror effect caused by a mirror layer that exerts the most significant influence on an entire mirror effect in the multilayer recording medium (hereinafter, referred to as a "main mirror layer") can be eliminated by adjusting the thickness of a spacer layer, the reflectivity of each recording layer is maximized to obtain a high CNR. When the mirror effect caused by the main mirror layer cannot be eliminated, the reflectivity must be reduced to decrease the mirror effect. As described above, a reduction in the reflectivity results in a decrease of the CNR. Accordingly, it is preferable to select the reflectivity from an optimal range giving a minimum jitter.

In operation 100, a spacer layer thickness is set in order to eliminate a mirror effect. In particular, the spacer layer thickness is set to eliminate a main mirror layer of a recording layer that is positioned at the bottom of the multilayer recording medium and exerts the most significant influence on the mirror effect. Preferably, the spacer layer thickness is set to satisfy the condition defined by Equation 1. Even though all spacer layers do not have a thickness satisfying Equation 1, signal characteristics can be remarkably improved by eliminating at least the main mirror layer of the recording layer at the bottom of the multilayer recording medium.

As described above, when the mirror effect is decreased by setting the thicknesses of some spacer layers to be different from the thickness of other spacer layers, if the thickness of a spacer layer exerting the most significant influence on the mirror effect is represented with D and the thickness of the other spacer layers is represented with $D_0$, it is preferable to satisfy Equation 4:

$$|D-D_0| \geq 2\delta + 0.1 D_0, \quad (4)$$

where $\delta$ is thickness error tolerance that may occur in a spacer layer during manufacturing. In this situation, the thickness of the spacer layers other than the spacer layer exerting the greatest influence on the mirror effect may be selected from a range of $D_0 \pm \delta$.

In operation 110, it is determined whether the mirror effect caused by the main mirror layer is eliminated with the spacer layer thickness set in operation 100. If it is determined that the mirror effect caused by the main mirror layer is not eliminated, in operation 120 it is determined whether the mirror effect caused by the main mirror layer is not eliminated due to a manufacturing error because even if the spacer layer thickness is set appropriately, it may be realized differently due to the manufacturing error. In other words, if the mirror effect of the main mirror layer is not eliminated simply because of the manufacturing error, the spacer layer thickness is reset. However, if the mirror effect of the main mirror layer cannot be eliminated even if the spacer layer thickness is realized correctly, the reflectivity of each recording layer is set to minimize jitter in operation 140.

If it is determined that the mirror effect of the main mirror layer is eliminated, the reflectivity of each recording layer is set to a maximum mean reflectivity as is possible to obtain a high CNR in operation 130. The maximum mean reflectivity is expressed by Equation 5:

$$R_{v\,max} = \prod_{i=1}^{N-1} (1 - R_i)^2, \quad (5)$$

where N is the number of recording layers in the multilayer recording medium, and $R_i$ is the reflectivity of each recording layer and can be calculated using Equation 6:

$$R_i = \frac{R_{N-1}}{\prod_{j=i+1}^{N-1} (1 - R_j)^2}. \quad (6)$$

The above description is mainly related to decreasing the mirror effect by adjusting the spacer layer thickness and the reflectivity. However, it is also possible to decrease the mirror effect just by adjusting the reflectivity of each recording layer such that Equations 3, 5, and 6 are satisfied regardless of the spacer layer thickness.

Figure 14:
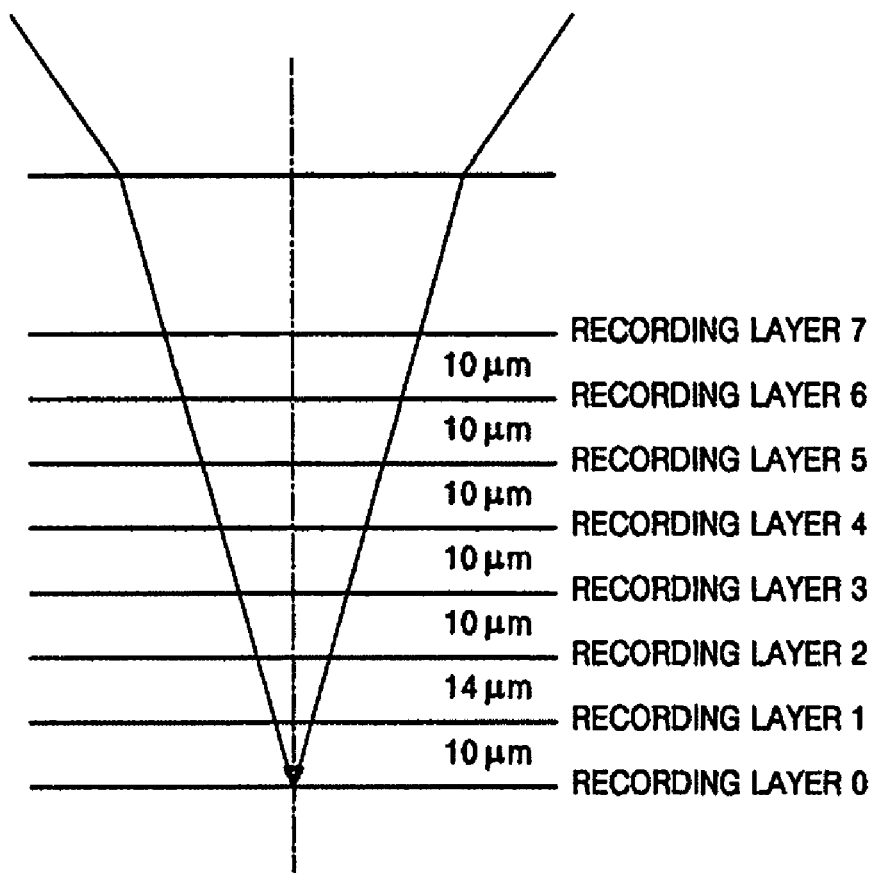
FIG. 14 illustrates a multilayer recording medium according to an embodiment of the present invention.

FIG. 14 illustrates a multilayer recording medium according to an embodiment of the present invention. The multilayer recording medium has eight recording layers, but the number of recording layers is not restricted to eight. It is apparent that the spirit of the present invention can be applied to a multilayer recording medium having more or less than eight recording layers. In the multilayer recording medium according to the current embodiment of the present invention illustrated in FIG. 14, only one spacer layer between recording layer 1 and recording layer 2 has a different thickness $D_2$ of 14 μm than the other spacer layers which have the same thickness of 10 μm.

Even if the thickness of only one spacer layer is changed, mirror layers of the recording layers 0 and 1 that exert the most significant influence on a mirror effect can be eliminated. As described above, the influence of the other recording layers 2 through 7 on the mirror effect is so small as to be ignorable. In other words, the mirror effect that may occur when data is reproduced from the recording layers 0 and 1 positioned at the bottom of the multilayer recording medium can be decreased by setting the thickness of a spacer layer second farthest from an incident beam to be different from the thickness of the other spacer layers.

As described above, when the thickness of only some of the spacer layers is set to be different from the thickness of the other spacer layers, the thickness of a spacer layer that exerts the most significant influence on the mirror effect is set to be different from the thickness of the other spacer layers such that Equation 4 is satisfied.

According to an embodiment of the present invention, the mirror effect can be remarkably decreased by resetting the thickness of only some spacer layers exerting the most significant influence on the mirror effect in a multilayer recording medium, without setting all spacer layers to have different thicknesses to eliminate all mirror effects caused by mirror layers. In the current embodiment of the present invention, it is preferable that only a mirror effect caused by a mirror layer having an intensity ratio of at least 0.02 is eliminated.

Table 3 shows a comparison of jitter between a case where only some spacer layers have a different thickness than the other spacer layers and an ideal case where no mirror effect exists.

TABLE 3

|  | layer 7 | layer 6 | layer 5 | layer 4 | layer 3 | layer 2 | layer 1 | layer 0 |
|---|---|---|---|---|---|---|---|---|
| Present Invention | 5.23% | 5.87% | 5.84% | 5.45% | 6.10% | 6.17% | 5.48% | 4.6% |
| Ideal | 5.23% | 5.87% | 5.84% | 5.41% | 6.04% | 6.04% | 5.48% | 4.6% |

Referring to Table 3, when the thickness of only some spacer layers is different from that of the other spacer layers as the multilayer recording medium according to the current embodiment of the present invention illustrated in FIG. 14, a very small jitter similar to that appearing in the ideal case with no mirror effect appears. Meanwhile, when the transmissivity of the spacer layers is about 97%, a maximum reflectivity of about 5.8% can be obtained.

Figure 15:
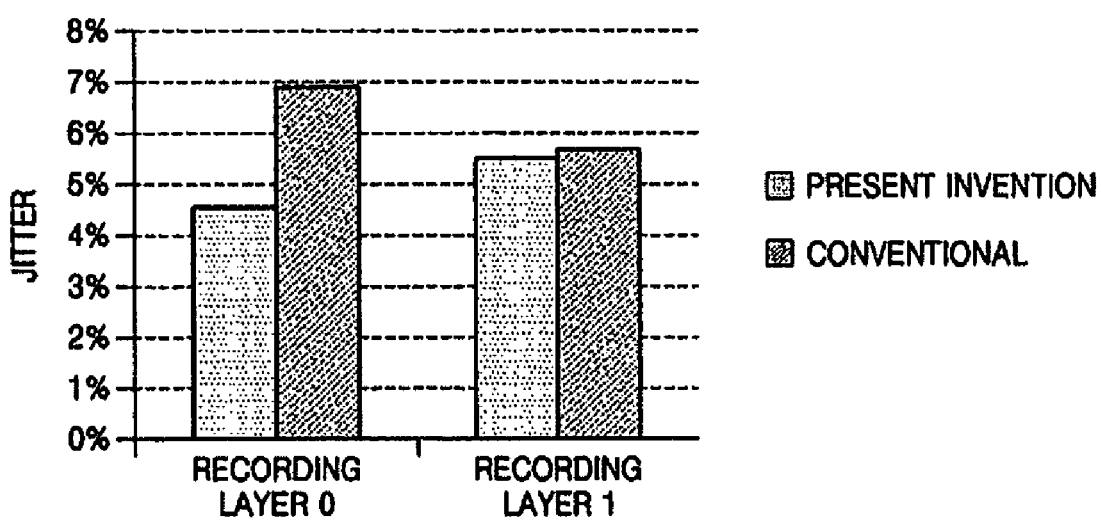
FIG. 15 is a graph illustrating a comparison between a multilayer recording medium according to an embodiment of the present invention and a conventional multilayer recording medium.

FIG. 15 is a graph illustrating a comparison between a multilayer recording medium according to an embodiment of the present invention and a conventional multilayer recording medium. In FIG. 15, jitter values with respect to the recording layers 0 and 1 on which the mirror effect is largest in an octa-layer recording medium are compared between the present invention and the conventional technology.

Referring to FIG. 15, in a multilayer recording medium according to an embodiment of the present invention, the mirror layers of the recording layers 0 and 1 exerting the most significant influence on the mirror effect are eliminated, thereby decreasing the mirror effect. As a result, the jitter values are also decreased. Accordingly, it is proved that the present invention can remarkably improve signal characteristics by changing the thickness of only some spacer layers without greatly changing the structure of the conventional multilayer recording medium.

In addition, as described above, even when the thickness of a spacer layer exerting the most significant influence on the mirror effect is not set to be different from that of the other spacer layers and all spacer layers have the same thickness due to a manufacturing error, the present invention can reduce the mirror effect by decreasing the reflectivity of each recording layer of a multilayer recording medium to a predetermined range giving a minimum jitter value. For example, in an octa-layer recording medium, the mirror effect can be reduced by setting the reflectivity of the recording layers 0 and 1 to 4.3-4.7%. The reflectivity of the other recording layers can be calculated using Equation 3.

As described above, an embodiment of the present invention provides a multilayer recording medium in which a mirror effect is greatly reduced. In addition, according to an embodiment of the present invention, the thickness of only a spacer layer exerting the most significant influence on the mirror effect is changed to prevent the deterioration of signal quality due to the mirror effect, and therefore, the structure of a multilayer recording medium is simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multilayer recording medium having a plurality of recording layers, wherein:

a thickness of at least one spacer layer between adjacent recording layers is different from a thickness of the other spacer layers such that a beam focusing on one of the recording layers is prevented from focusing on another one of the recording layers corresponding to a mirror layer due to reflection; and when a thickness of a spacer layer between a recording layer "i" and a recording layer "i−1" is $D_i$, the thickness $D_i$ satisfies:

$$\sum_{i=K+1}^{L} D_i \neq \sum_{j=L+1}^{Q} D_j,$$

where N is a number of all recording layers included in the multilayer recording medium, K=0, 1, 2, ..., N−3 is a serial number of each recording layer, L=K+1, K+2, ..., N−2 is a serial number of a recording layer that is located above a recording layer K and from which an incident beam is reflected, and Q=L+1, L+2, ..., N−1 is a serial number of a recording layer located above a recording layer L from which the incident beam is reflected.

2. The multilayer recording medium of claim 1, wherein the spacer layer having the different thickness is a spacer layer that is second farthest from an incident beam.

3. The multilayer recording medium of claim 1, wherein the spacer layer having the different thickness is a spacer layer that exerts at least a predetermined degree of influence on a mirror effect.

4. The multilayer recording medium of claim 1, wherein the thickness of only some spacer layers exerting most significant influence on a mirror effect in the multilayer recording medium is set, without setting all spacer layers.

5. A multilayer recording medium having a plurality of recording layers, wherein:

a thickness of at least one spacer layer between adjacent recording layers is different from a thickness of the other spacer layers such that a beam focusing on one of the recording layers is prevented from focusing on another one of the recording layers corresponding to a mirror layer due to reflection; and when the different thickness of the at least one spacer layer is D and the thickness of the other spacer layers is $D_0$, a difference between D and $D_0$ satisfies:

$|D-D_0| \geq 2\delta + 0.1 D_0$, where $\delta$ is a thickness error tolerance that may occur in a spacer layer during manufacturing.

6. A multilayer recording medium having a plurality of recording layers, wherein:

a thickness of at least one spacer layer between adjacent recording layers is different from a thickness of the other spacer layers such that a beam focusing on one of the recording layers is prevented from focusing on another one of the recording layers corresponding to a mirror layer due to reflection;

the spacer layer having the different thickness is a spacer layer that exerts at least a predetermined degree of influence on a mirror effect; and the influence on the mirror effect is determined using a ratio $\alpha_{KM}$ of intensity of a beam reflected from the mirror layer to intensity of a beam reflected from the recording layer on which the beam focuses and expressed by:

$$\alpha_{KM} = \frac{R_M}{R_K} \prod_{i=K+1}^{M-1} \frac{R_i^2}{T_i^2},$$

where K is a serial number of the recording layer on which the beam focuses, M is a serial number of the mirror layer, $R_i$ is reflectivity of a recording layer "i", and $T_i$ is transmissivity of the recording layer "i".

7. The multilayer recording medium of claim 6, wherein, when the ratio $\alpha_{KM}$ is less than a predetermined value, the reflectivity of the recording layer is set to a maximum value.

8. The multilayer recording medium of claim 6, wherein, when the ratio $\alpha_{KM}$ is greater than a predetermined value, the reflectivity of the recording layer is set to a value that produces a minimum jitter value.

9. The multilayer recording medium of claim 7, wherein the predetermined value is 0.02.

10. The multilayer recording medium of claim 8, wherein the predetermined value is 0.02.

11. A multilayer recording medium having a plurality of recording layers, wherein:

a thickness of at least one spacer layer between adjacent recording layers is different from a thickness of the other spacer layers such that a beam focusing on one of the recording layers is prevented from focusing on another one of the recording layers corresponding to a mirror layer due to reflection; and when the number of all recording layers included in the multilayer recording medium is N, a mean reflectivity of each recording layer is $R_v$, and a serial number of each recording layer is K, a reflectivity $R_K$ of each recording layer K satisfies:

$$R_K = \frac{R_v}{\prod_{i=K+1}^{N-1} T_i^2}, R_{N-1} = R_v.$$

12. A method of manufacturing a multilayer recording medium having a plurality of recording layers, the method comprising:

forming at least one spacer layer between adjacent recording layers, the one spacer layer having a different thickness from a thickness of the other spacer layers such that a beam focusing on one of the recording layers is prevented from focusing on another one of the recording layers corresponding to a mirror layer due to reflection;

wherein, when the number of all recording layers included in the multilayer recording medium is N, a mean reflectivity of each recording layer is $R_v$, and a serial number of each recording layer is K, a reflectivity $R_K$ of each recording layer K satisfies:

$$R_K = \frac{R_v}{\prod_{i=K+1}^{N-1} T_i^2}, R_{N-1} = R_v.$$

13. A multilayer recording medium having a plurality of recording layers, wherein:

a thickness of at least one spacer layer between adjacent recording layers is different from a thickness of the other spacer layers such that a beam focusing on one of the recording layers is prevented from focusing on another one of the recording layers corresponding to a mirror layer due to reflection; and the recording layer has a maximum mean reflectivity $R_{v\,max}$ satisfying:

$$R_{vmax} = \prod_{i=1}^{N-1} (1 - R_i)^2,$$

where N is the number of recording layers included in the multilayer recording medium, and $R_i$ is the reflectivity of each recording layer and is expressed by $$R_i = \frac{R_{N-1}}{\prod_{j=i+1}^{N-1} (1 - R_j)^2}.$$

14. A method of manufacturing a multilayer recording medium having a plurality of recording layers, the method comprising:

forming at least one spacer layer between adjacent recording layers, the one spacer layer having a different thickness from a thickness of the other spacer layers such that a beam focusing on one of the recording layers is prevented from focusing on another one of the recording layers corresponding to a mirror layer due to reflection;

wherein, when a thickness of a spacer layer between a recording layer "i" and a recording layer "i−1" is $D_i$, the thickness $D_i$ satisfies:

$$\sum_{i=K+1}^{L} D_i \neq \sum_{j=L+1}^{Q} D_j,$$

where N is a number of all recording layers included in the multilayer recording medium, K=0, 1, 2, . . . , N−3 is a serial number of each recording layer, L=K+1, K+2, . . . , N−2 is a serial number of a recording layer that is located above a recording layer K and from which an incident beam is reflected, and Q≦L+1, L+2, . . . , N−1 is a serial number of a recording layer located above a recording layer L from which the incident beam is reflected.

15. The method of claim 14, wherein the one spacer layer having the different thickness is a spacer layer that is second farthest from an incident beam.

16. The method of claim 14, wherein the one spacer layer having the different thickness is a spacer layer that exerts at least a predetermined degree of influence on a mirror effect.

17. A method of manufacturing a multilayer recording medium having a plurality of recording layers, the method comprising:
    forming at least one spacer layer between adjacent recording layers, the one spacer layer having a different thickness from a thickness of the other spacer layers such that a beam focusing on one of the recording layers is prevented from focusing on another one of the recording layers corresponding to a mirror layer due to reflection;
    wherein, when the different thickness of the at least one spacer layer is D and the thickness of the other spacer layers are $D_0$, a difference between D and $D_0$ satisfies:

$|D-D_0| \geq 2\delta + 0.1 D_0$, where δ is a thickness error tolerance that may occur in a spacer layer during manufacturing.

18. A method of manufacturing a multilayer recording medium having a plurality of recording layers, the method comprising:
    forming at least one spacer layer between adjacent recording layers, the one spacer layer having a different thickness from a thickness of the other spacer layers such that a beam focusing on one of the recording layers is prevented from focusing on another one of the recording layers corresponding to a mirror layer due to reflection;
    wherein the one spacer layer having the different thickness is a spacer layer that exerts at least a predetermined degree of influence on a mirror effect; and
    wherein the influence on the mirror effect is determined using a ratio $\alpha_{KM}$ of intensity of a beam reflected from the mirror layer to intensity of a beam reflected from the recording layer on which the beam focuses and expressed by:

$$\alpha_{KM} = \frac{R_M}{R_K} \prod_{i=K+1}^{M-1} \frac{R_i^2}{T_i^2},$$

where K is a serial number of the recording layer on which the beam focuses, M is a serial number of the mirror layer, R is reflectivity of a recording layer "i", and $T_i$ is transmissivity of the recording layer "i".

19. The method of claim 18, further comprising setting the reflectivity of the recording layer to a maximum value when the ratio $\alpha_{KM}$ is less than a predetermined value.

20. The method of claim 18, further comprising setting the reflectivity of the recording layer to a value that produces a minimum jitter value when the ratio $\alpha_{KM}$ is greater than a predetermined value.

21. The method of claim 19, wherein the predetermined value is 0.02.

22. The method of claim 20, wherein the predetermined value is 0.02.

23. A method of manufacturing a multilayer recording medium having a plurality of recording layers, the method comprising:
    forming at least one spacer layer between adjacent recording layers, the one spacer layer having a different thickness from a thickness of the other spacer layers such that a beam focusing on one of the recording layers is prevented from focusing on another one of the recording layers corresponding to a mirror layer due to reflection;
    wherein the recording layer has a maximum mean reflectivity $R_{v\,max}$ satisfying:

$$R_{vmax} = \prod_{i=1}^{N-1} (1 - R_i)^2,$$

where N is the number of recording layers included in the multilayer recording medium, and $R_i$ is the reflectivity of each recording layer and is expressed by $$R_i = \frac{R_{N-1}}{\prod_{j=i+1}^{N-1} (1 - R_j)^2}.$$

24. A multilayer recording medium having a plurality of recording layers, wherein a mirror effect is reduced by decreasing a reflectivity of the plurality of recording layers to a predetermined range, and a reflectivity $R_K$ of each of the plurality of recording layers K satisfies:

$$R_K = \frac{R_v}{\prod_{i=K+1}^{N-1} T_i^2}, \quad R_{N-1} = R_v,$$

where N is the number of all recording layers included in the multilayer recording medium, $R_v$, is a mean reflectivity of each recording layer, T is transmissivity of a recording layer i and K is a serial number of each recording layer.

* * * * *

UNITED STATES PATENT AND TRADEMARK OFFICE
CERTIFICATE OF CORRECTION

PATENT NO. : 7,567,493 B2
APPLICATION NO. : 11/290593
DATED : July 28, 2009
INVENTOR(S) : Tao Hong et al.

It is certified that error appears in the above-identified patent and that said Letters Patent is hereby corrected as shown below:

Column 17, line 12, change "$Q \leqq L+1$," to --$Q=L+1$,--;

Column 18, line 57, change "T" to --Ti--.

Signed and Sealed this

Tenth Day of November, 2009

David J. Kappos
*Director of the United States Patent and Trademark Office*